Patented Apr. 25, 1950

2,504,989

UNITED STATES PATENT OFFICE 2,504,989

MODIFIED ROSIN ESTERS

Ray V. Lawrence and Muriel W. Kaufmann, New Orleans, La., assignors to the United States of America as represented by the Secretary of Agriculture No Drawing. Application May 24, 1946,
Serial No. 672,045

2 Claims. (Cl. 260—104)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a new composition of matter, a synthetic resin, and a method for producing it. The resin consists essentially of a modified rosin ester which is prepared by esterifying the reaction product of rosin and lactic acid with an alcohol. This resin has characteristics which make it valuable for use in varnishes, printing inks, and lacquers, and also as a plasticizer for other resins and in synthetic rubber.

We have found that when rosin and lactic acid are heated together at, for example, 250° to 260° C. for from 30 minutes to 2 hours, a product is formed which has a lower acid number than either of the original products. Thus, when rosin of an acid number of 165 is reacted with 30 percent of its weight of lactic acid for 30 minutes, a product having an acid number of 137 to 145 is formed, whereas, theoretically, such a mixture should have an acid number of approximately 270.

The properties of this resin may be varied by varying the amount of lactic acid added to the rosin and by varying the amount and type of alcohol used for esterification. The product obtained by heating rosin which contains from 2 to 40 percent lactic acid reacts with alcohols much more rapidly than rosin alone. The modified esters thus formed are in general similar in physical properties to the corresponding rosin esters. In general, as the lactic acid content of the resin is increased the rate at which the product will react with an alcohol is increased. Thus, at 250° C., rosin and 2,3 butylene glycol will reach an acid number of 78 in 5 hours; if 2 percent lactic acid is added to the rosin, an acid number of 67 is reached in 5 hours; and when rosin containing 22 percent lactic acid is used under the same conditions, an acid number of approximately 25 is obtained in 5 hours. In general, increasing percentages of lactic acid tend to produce decreasing brittleness in the finished ester.

The reaction between rosin and lactic acid may be carried out at temperatures between 220° C. and 290° C., for example, and may be continued for from 15 minutes to 5 hours. Thus, it was found that, when rosin containing 22 percent lactic acid was heated at 225° C. for 5 hours, a product having an acid number of 143 was formed, and when the resulting product was heated with 2,3 butylene glycol for 5 hours at 225° C., it yielded a modified ester having an acid number of 13. At temperatures of 260° C. and above, a reaction time of 30 minutes was satisfactory for the reaction between rosin and lactic acid.

In order to obtain a reasonably rapid rate of reaction between rosin and an alcohol, it is usually necessary to carry out the reaction at temperatures of 250° C. and above. The use of temperatures above 250° C. is often inconvenient because of the low boiling point of the desired alcohol. It has now been found that, if the rosin is first caused to react with 2 to 40 percent of its weight of lactic acid at, for example, approximately 260° C., the product so formed will react with alcohols at a satisfactory rate at temperatures as low as 200° to 225° C.

The alcohols used may be monohydric alcohols such as, for example, octyl, lauryl, stearyl or operable equivalents thereof; or they may be aliphatic glycols such as, for example, ethylene glycol, propylene glycol, butylene glycol, diethylene glycol, triethylene glycol or operable equivalents thereof; or they may be polyhydric alcohols such as, for example, glycerol, diglycerol, xylitol, mannitol, sorbitol, pentaerythritol, trimethylol propane or operable equivalents thereof.

The rosin used in the preparation of these products may be gum rosin, wood rosin, or hydrogenated rosin; or it may be a stabilized rosin of the type described as United States Patent No. 2,239,555; or it may be abietic acid.

The concentration of lactic acid used is not critical, since the temperatures used will remove the excess water; but to avoid excessive frothing, a solution containing 80 to 90 percent lactic acid is to be preferred for this reaction. Lactic acid solutions of this concentration are known to contain lactic anhydride, lactyl lactic acid, and lactid. The exact nature of the chemical reaction between lactic acid and rosin is not known.

The following examples will serve to illustrate our invention, but they are not to be considered as limiting it to these particular components, proportions, or conditions of reaction.

EXAMPLE I

One hundred fifty parts by weight of "WW" gum rosin were heated to 250° C. and held at this temperature while 50 parts by weight of 85 percent lactic acid was added over a period of 2½ hours. Thirty minutes after all of the lactic acid had been added, 16 parts by weight of glycerol was added during a period of 6 minutes. The reaction with the glycerol was continued for 4½ hours at 250° C. At the end of this time, the product had an acid number of 5.9 and a melting point (ring and ball) of 74.5° C.

EXAMPLE II

Six samples of 150 parts by weight of rosin each were reacted with varying amounts of lactic acid for approximately 30 minutes before the alcohol was added. The effect of the various concentrations of lactic acid is shown in Table No. I. In this example, 2,3 butylene glycol is employed.

*Table I*

|  | A | B | C | D | E | F |
|---|---|---|---|---|---|---|
| Rosin, Parts by weight | 150 | 150 | 150 | 150 | 150 | 150 |
| Lactic Acid (85%), Parts by weight | None | 3 | 10 | 20 | 30 | 50 |
| 2, 3 Butylene Glycol, Parts by weight | 33 | 31 | 31 | 26 | 26 | 26 |
| Temperature of Reaction, °C | 250 | 250 | 250 | 260 | 260 | 260 |
| Reaction Time, Hours | 10 | 10 | 5½ | 4½ | 4½ | 3½ |
| Acid Number of Product | 55 | 32 | 35 | 32.3 | 26.7 | 31.3 |
| Melting Point, °C. (ring and ball) | 78 | 65 | 73 | 67 | 70 | 59 |
| Color Grade | M | K | M | N | N | WG |

It will be seen from Table I that the product formed, when rosin and lactic react at approximately 250° C., reacts much more rapidly with the 2,3 butylene glycol than does rosin alone.

EXAMPLE III

Two samples of rosin, 150 parts by weight each, were heated with 3 parts and 10 parts by weight of lactic acid, respectively, at 290° C. for slightly less than 15 minutes. Fifteen parts by weight of glycerol was then added to the rosin-lactic acid product, and the temperature was held at 290° C. For comparison, 150 parts by weight of rosin was esterified with 15 parts by weight of glycerol at 290° C. The results are shown in Table II.

*Table II*

|  | A | B | C |
|---|---|---|---|
| Rosin, Parts by weight | 150 | 150 | 150 |
| Lactic Acid (85%), Parts by weight | None | 3 | 10 |
| Glycerol, Parts by weight | 15 | 15 | 15 |
| Temperature of Reaction °C | 290 | 290 | 290 |
| Reaction Time, Hours | 2 | 2 | 2 |
| Acid Number | 25 | 20 | 15 |
| Melting Point, °C. (ring and ball) | 93 | 95 | 93 |

These results show that when rosin is reacted with lactic acid prior to esterification, the ester gum produced has a lower acid number than is obtained under the same conditions in the absence of the lactic acid.

EXAMPLE IV

One hundred fifty parts by weight of rosin and 50 parts by weight of 85 percent lactic acid were heated together at a temperature of 250° C. for 3 hours. At this time, the addition of 21 grams of mannitol was started and was continued for a period of 2 hours. The esterification was continued at 250° C. for 6 hours after all of the mannitol had been added, making a total esterification time of 8 hours. The product formed had an acid number of 23.0 and a melting point of 114.5° C.

EXAMPLE V

One hundred fifty parts by weight of rosin and 24 parts by weight of 85 percent lactic acid were heated to 260° C. and held at this temperature for 30 minutes, after which time 24 parts by weight of 1,2-propylene glycol was added slowly over a period of 2 hours. This run was repeated at the same temperature, using the same amounts of rosin and propylene glycol, but no lactic acid. The results are given in the following table.

*Table III*

|  | A | B |
|---|---|---|
| Rosin, Parts by weight | 150 | 150 |
| Lactic Acid (85%), Parts by weight | None | 24 |
| 1,2-Propylene Glycol, Parts by weight | 24 | 24 |
| Temperature of Reaction, °C | 260 | 260 |
| Reaction Time, Hours | 5 | 5 |
| Acid Number | 36.9 | 7.3 |

The run with lactic acid (B) shows a very much lower acid number than the control run (A).

EXAMPLE VI

One hundred parts by weight of rosin was heated with 16 parts by weight of lactic acid for 30 minutes at 260° C. At the end of this time, the addition of 46.5 parts by weight of normal octyl alcohol was begun. The temperature was maintained at 260° C. and the octyl alcohol was added slowly over a period of 6 hours. At the end of 7 hours, the reaction product was a viscous liquid having an acid number of 32.5.

EXAMPLE VII

One hundred fifty parts by weight of hydrogenated rosin was heated with 24 parts by weight of lactic acid for 30 minutes at 260° C. At the end of this time, 15 parts by weight of glycerol was added and the temperature held at 260° C. for 6 hours. The ester formed had an acid number of 5.1 and a melting point (ring and ball) of 81.2° C.

EXAMPLE VIII

One hundred fifty parts by weight of rosin was heated with 48 parts by weight of 85 percent lactic acid for 30 minutes at 260° C. After this reaction period 16 parts by weight of pentaerythritol was added. The temperature was maintained at 260° C. for 6 hours and 45 minutes after the addition of the pentaerythritol. At this time, the reaction product had an acid number of 9.5 and a melting point (ring and ball) of 110.5° C.

EXAMPLE IX

One hundred parts by weight of rosin and 33 parts by weight of 85 percent lactic acid were heated together for 4½ hours at 225° C. The acid number of the product formed was 143, and the melting point (ring and ball) was 68° C. The temperature was held at 225° C., and 50 parts by weight of 2,3 butylene glycol was added over a period of 6 hours, at which time the acid number of the product was 8.6.

In summary, the process comprises heating an acid substance of the group consisting of rosins and abietic acid with from 2 to 40 percent of its weight of lactic acid at a temperature between about 220° C. and 290° C. for a period of from about 15 minutes to 5 hours, and heating the product so formed with an alcohol at between about 200° and 290° C. for a period of from about 2 to 12 hours.

Having thus described our invention, we claim:

1. A process for preparing a synthetic resin, comprising heating rosin with lactic acid in the ratio of one hundred and fifty parts of rosin to about 40.8 parts of lactic acid for about 30 minutes at about 260° C., and heating the product with about 16 parts of pentaerythritol at about 260 C. for about six hours and forty-five minutes.

2. The product prepared by the process of claim 1, having an acid number of 9.5 and a melting point of about 110.5° C.

RAY V. LAWRENCE.
MURIEL W. KAUFMANN.

REFERENCES CITED

The following references are of record in the file of this patent:

UNITED STATES PATENTS

| Number | Name | Date |
| --- | --- | --- |
| 2,298,914 | Auer | Oct. 13, 1942 |
| 2,440,242 | Auer | Apr. 27, 1948 |

FOREIGN PATENTS

| Number | Country | Date |
| --- | --- | --- |
| 508,016 | Great Britain | June 21, 1939 |

OTHER REFERENCES

Paint and Varnish Production Manager, vol. 10, February 1934, page 24.